United States Patent [19]
Babb et al.

[11] 3,718,206
[45] Feb. 27, 1973

[54] AMPHIBIOUS SEISMIC EXPLORATION VEHICLE AND METHOD

[75] Inventors: John J. Babb; Marvin G. Bays, both of Jackson, Miss.

[73] Assignee: Delta Exploration Company, Inc., Jackson, Miss.

[22] Filed: Jan. 18, 1971

[21] Appl. No.: 107,247

[52] U.S. Cl............181/.5 VM, 181/.5 EC, 181/.5 H
[51] Int. Cl. ...............................................G01v 1/14
[58] Field of Search...............181/.5 VM, .5 EC, .5 H

[56] References Cited

UNITED STATES PATENTS 3,301,345   1/1967   Carder............................181/.5 VM Primary Examiner—Benjamin A. Borchelt
Assistant Examiner—J. V. Doramus
Attorney—Pravel, Wilson & Matthews

[57] ABSTRACT

A seismic signal providing vehicle is provided in the form of pneumatic tires rollingly supporting a hollow metal casing with a body of liquid on the interior of the casing communicating with the interior of the tires and an expandible acoustic signal transducer being positioned in the body of liquid in the casing for activation for transmitting a pressure pulse to the surface of the tires from which the signal is radiated into the environmental surroundings of the tires either on dry land or under water.

27 Claims, 3 Drawing Figures

INVENTORS
MARVIN G. BAYS &
JOHN J. BABB

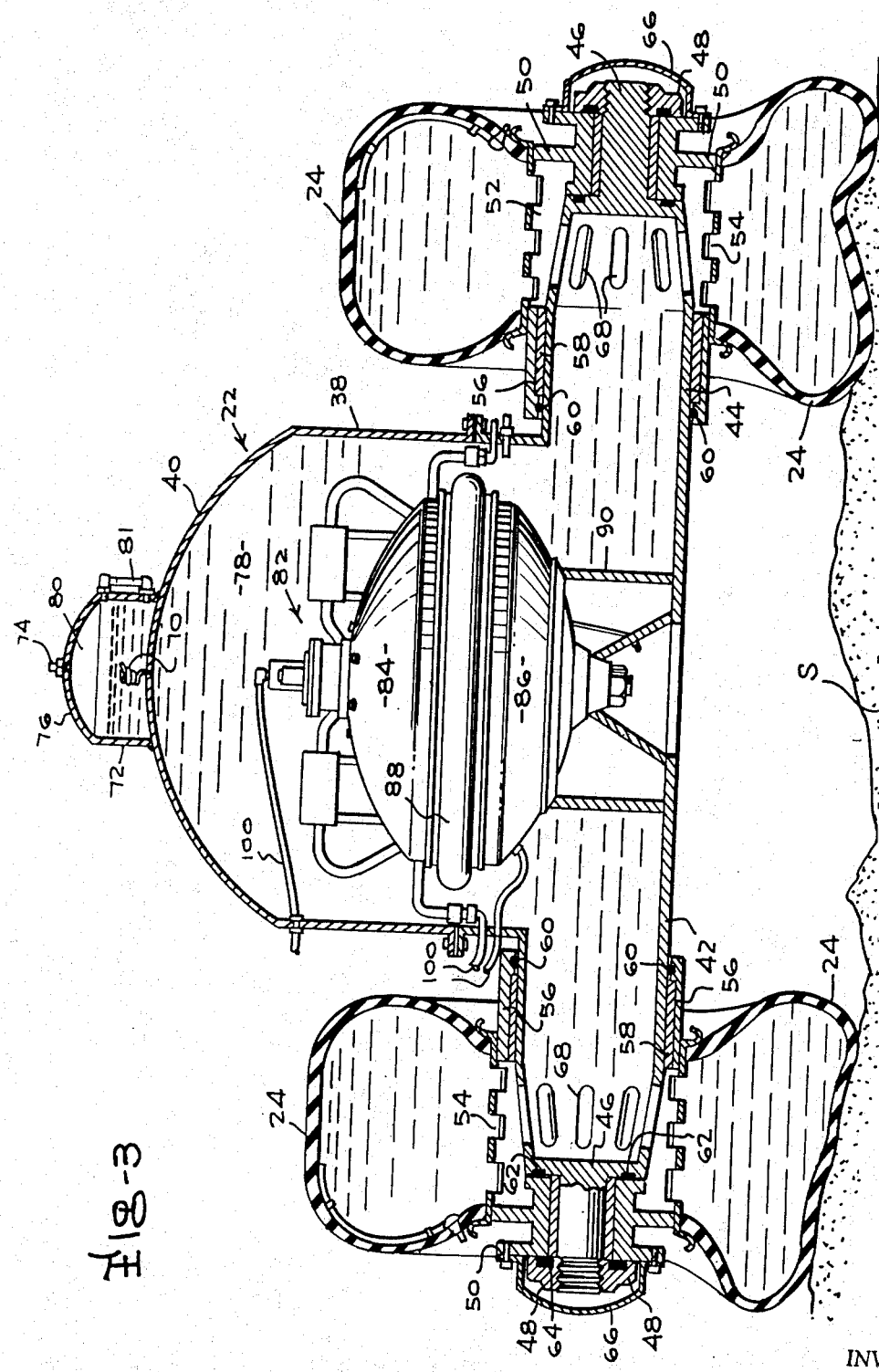

AMPHIBIOUS SEISMIC EXPLORATION VEHICLE AND METHOD

This invention is in the field of geophysical signal providing means and methods and is directed to a seismic signal producing apparatus which radiates a seismic signal created by mechanical and hydraulic means for use in both dry land and under-water seismic geophysical exploration.

Previously known seismic exploration methods initially employed explosive means for providing seismic signals both in land-based operations and under-water exploring operations. However, in recent years, it has become apparent that the use of explosive signal providing means is undesirable for a number of reasons. Consequently, those skilled in the art have come forward with a number of non-explosive devices capable of providing a seismic signal for use in subterranean exploration.

Unfortunately, the prior known non-explosive systems have suffered from a number of deficiencies which have precluded their usage in many operations and have severely limited their capabilities in other operations.

A particularly acute problem arises from the fact that previously known seismic signal providing devices have not been capable of satisfactory usage in both dry land and marine exploration. For example, U. S. Pat. No. 3,306,391 issued to one of the the co-inventors of this invention, illustrates a seismic transducer which is limited to usage on dry land. Other seismic signal source means such as that illustrated in U. S. Pat. No. 3,394,775 to Cole et al. are limited to usage in marine exploration. Additionally, limited capability hybrid devices have evolved for use in connection with exploration in marsh lands and the like.

Consequently, it will be readily appreciated that there has been a long felt need for a seismic energy device capable of usage in dry land, marsh land and under-water exploration.

Another substantial problem encountered with previously known seismic signal devices used in connection with marine exploration is that such have failed to provide adequate signal energy strength in shallow water exploring operations in water of 25 feet or less depth. This transitional zone has been extremely difficult to explore satisfactorily due to the low energy signal strength caused by the cancelling nature of certain reflected frequencies which are reflected downward from the surface of the water in which the signal source transducer is employed. Another reason for the loss of strength in the signal in shallow water is caused by the lower hydrostatic loading on the device as compared to deeper water operation.

Therefore, it is the primary object of this invention to provide a new and improved seismic signal source device.

Realization of the object of this invention is enabled through the provision of a vehicle in the form of a hollow heavy metal casing member comprising the main frame of the vehicle and having pneumatic type tires mounted on a lateral extension on each side for supporting the casing member. A hollow liquid filled chamber is provided on the interior of the casing and includes an expandable transducer device externally actuable by means of hydraulic or pneumatic signals or the like for providing a rapid expansion and/or contraction to create a pressure reactive signal throughout the entire liquid body in the interior of the casing member. Fluid passageways are provided to enable fluid communication between the interior of the casing and the interior of the tire members so that volumetric displacement of the transducer causes an equal volumetric displacement of the tire members.

Consequently, actuation of the expandable acoustic signal providing transducer provides a resultant pressure pulse throughout the interior of the casing which flows into the tire members. The partially collapsed tire members rapidly expand to react with the supporting surface, which may be either dry land, the bottom of a shallow body of water or a body of water in which the device is suspended. This reaction of the tire members with their environment is caused by the flexing of the tire members created by the volume change received in their interiors. Moreover, the subject invention can be employed in deeper water by supporting the entire device from a barge or the like at a depth of approximately 40 feet for deep-water operation. As thus employed, the tires of the device radiate a signal through the water upon actuation of the expandable acoustic signal providing transducer on the interior of the casing.

A more full and complete understanding of the preferred embodiment of the invention will be achieved when the following written description is read in conjunction with the drawings in which:

FIG. 3 is a sectional view taken along lines 3—3 of FIG. 2.

Figure 1:
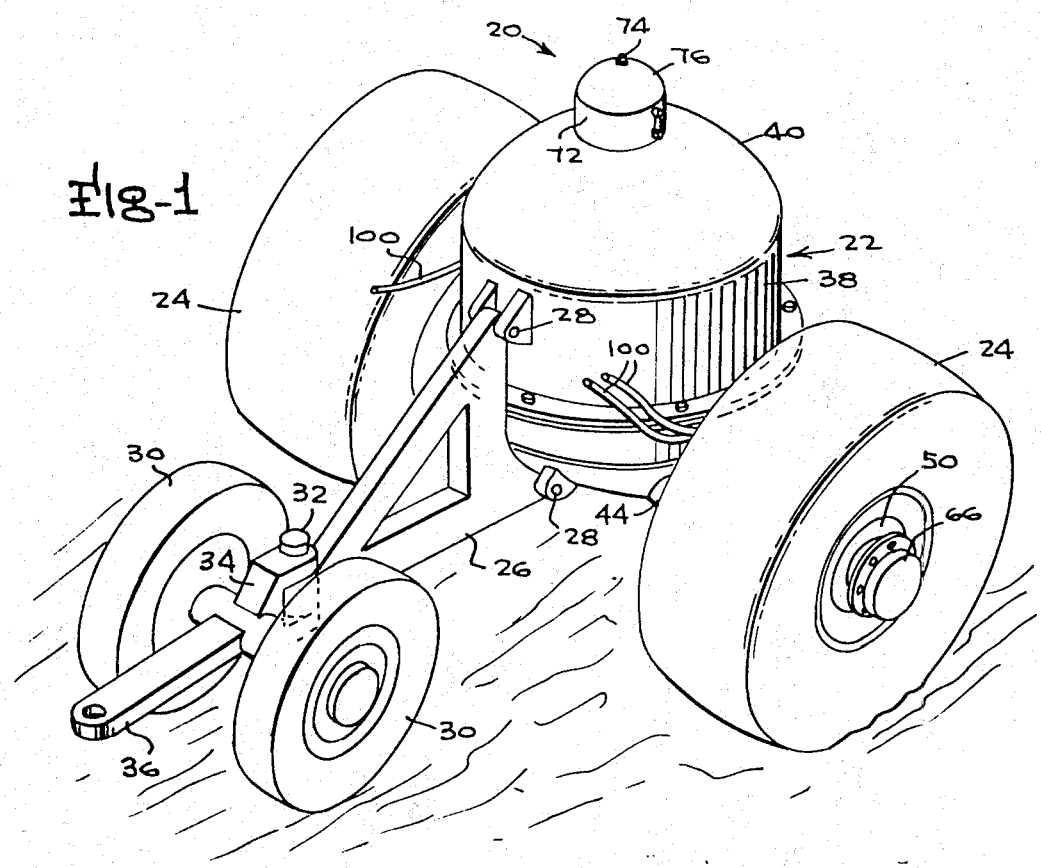
FIG. 1 is a perspective view of the preferred embodiment being employed in dry or marsh land exploration.

Attention is initially invited to FIG. 1 which illustrates the preferred embodiment, generally designated 20, and which includes primary components consisting of a main hollow casing 22 formed of steel or other high strength metal and a pair of large hollow pneumatic type tires 24 provided on each side of the casing. Tires 22 provide support for casing 24 and a forwardly extending steering frame 26 is connected to the casing 22 by pins 28. A pair of steering wheels 30 are connected to the forward end of frame 26. Steering wheels 30 are pivotally connected to the forward end of steering frame 26 by means of a pin and clevis arrangement 32, 34 and the wheels 30 are steerable by actuation of a towing steering bar 36 in an obvious manner. Therefore, it will be obvious that the preferred embodiment 20 constitutes a towable vehicle device the direction of movement of which can be easily controlled.

Hollow casing 22 is formed by a main cylindrical component 38 having a domed top 40 and first and second hollow transversely extending tubular arms 42 and 44 which extend outwardly from each side of the main cylindrical casing component 38 adjacent the bottom thereof. Tubular arms 42 and 44 are in axial alignment with each other and are maintained on each end of the arms by a stub shaft and plate assembly 46. Tires 24 are mounted on the stub shaft and plate assembly 46 for rotation and are held in position by threaded bolts 48 which engage the outer side of hub members 50 upon which the tires 24 are mounted. Hub members 50 include an apertured internal cylindrical portion 52 extending across the entire width of the tires 24 and having apertures 54 for a purpose to be discussed hereinafter. Additionally, the hub 50 includes an internal bearing sleeve 56 having an internal sleeve 58 engaging the exterior surface of the tubular arms 42, 44 for rotation with respect thereto. A ring seal 60 is provided on the end of the cylindrical portion 56 to engage the external surface of the arms 42, 44 and further seal members 62, 64 are provided on the external portion of the hub rotatingly engaged with the stub shaft 46 etc. as best shown in FIG. 3. A cover 66 is connected over the end of the shaft 46 etc. for preventing entry of foreign material into the bearing area.

The outer ends of the arms 42, 44 are provided with apertures 68 for permitting the flow of fluid inwardly and outwardly through the apertures 68 and the previously discussed apertures 54 in the hub. Consequently, it will be seen that the apertures 54, 68 provide fluid communication between the interior of the casing 22 and the interior of tire members 24 with the respective seal members 60, 62 and 64 preventing the escape of any fluid but enabling the rotary movement of the tires 24.

Domed top portion 40 of the casing 22 has a capillary tube 70 extending through its uppermost end into the interior of an air-trap dome 72. A bleed valve 74 is provided in the top portion 76 of dome 72.

A body of fluid 78 fills the entire space on the interior of casing 22, arms 42, 44 and tires 24 and extends upwardly into dome 72. The fluid body 78 would normally comprise nothing more than water; however, if the apparatus is to be used in colder climates, an antifreeze solution would be added to the water. It should be noted that the fluid extends upwardly into the air-trap dome 72 with an air pocket 80 being over the upper level of the liquid and the fluid level viewable through a sight glass 81 being adjustable by means of the bleed valve 74.

An expandible acoustic signal providing transducer means 82 is mounted on the interior of casing 22 for actuation to provide a volumetric displacement on the interior of the casing in a manner to be discussed hereinafter. It is initially noted that transducer 82 can be any conventional transducer capable of rapid volumetric expansion for producing a seismic signal. The transducer illustrated in the drawings is Model No. Y-50-MT manufactured by the Westinghouse Air Brake Company, Drilling Equipment Division, Enid, Okla.

The particular transducer illustrated in FIG. 3 includes first and second clam shell housing members 84, 86 connected by a flexible rubber sealing ring 88 so as to be axially movable with respect to each other. Clam shell housing member 86 is connected to the casing 22 by means 90 etc. and a piston and cylinder assembly (not shown) is provided on the interior of the clam shell members 84, 86 for rapidly moving the clam shell members 84, 86 toward and from each other to provide a seismic signal. Control and power hose members 100 extend inwardly through the casing 22 for connection to the transducer 82 to control the operation thereof. It should be understood that the internal working parts of the transducer 82 are completely conventional and form no part of this invention, and are, consequently, not illustrated nor will they be discussed further. Moreover, other conventional seismic signal transducers such as that shown in U. S. Pat. Nos. 3,384,868; 3,394,775 and others could easily be employed in place of the particular transducer illustrated. In fact, any transducer which would provide a volumetric change within the casing 22 such as gas/oxygen gun or other explosively driven apparatus including high pressure air devices could be used as the source of the internal signal inside casing 22.

Actuation of transducer 82 immediately creates a fluid motion in the liquid body 78 which is conveyed through openings 68,54 to tires 24. Since the apparatus is quite heavy (its weight exceeds its buoyancy when submerged as shown in FIG. 2 by approximately 15,000 pounds), the volume change is received internally of tires 24 to flex the tires and is effectively communicated to the supporting surface S upon which the device is positioned.

Figure 2:
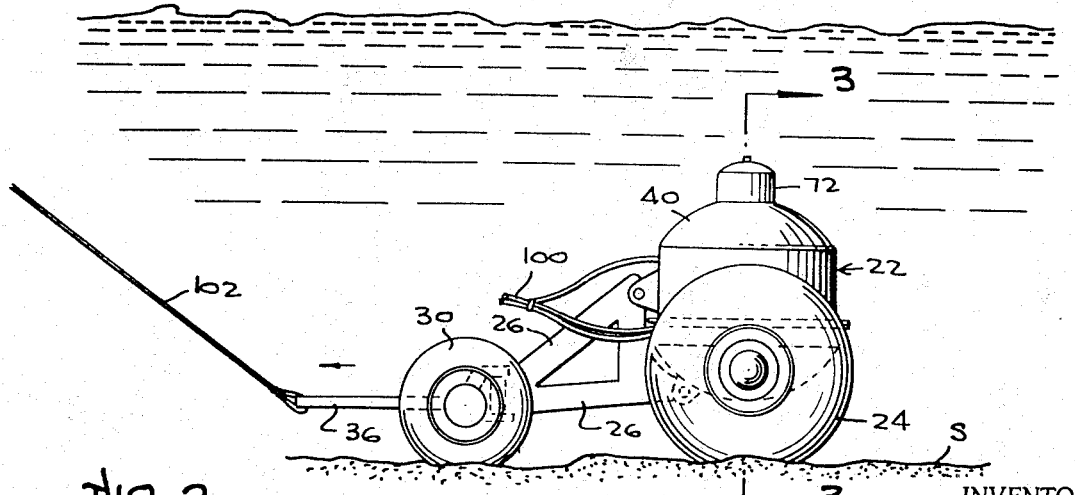
FIG. 2 is a side elevational view illustrating the preferred embodiment as employed in shallow water exploration.

When in shallow water as illustrated in FIG. 2, the supporting surface S is the bottom of the body of water; however, when the device is being used on dry land as shown in FIG. 3, the supporting surface is the land itself.

Due to the ground contact or direct coupling of the tires with the surface S, tire motion produces particle motion which creates waves of acoustic energy directly into the ground. Therefore, this action attenuates the frequency cancelling effects found in shallow water seismic exploration. The subject device is quite effective in water bodies in the range of from zero to 15 feet in depth while other existing non-explosive devices are very ineffective due to inefficient coupling in such environments.

The subject invention is also usable in deep water exploration in which it is impossible to tow the device across the bottom of the water body by means of a tow cable such as cable 102 in FIG. 2. In such deep water operation, the device is suspended from a supporting vessel and the flexing of tires 24 provides an effective signal source acting upon the water body itself. It is again pointed out that volumetric changes in the internal chamber of casing 22 are transferred to the tires immediately by virtue of the near incompressibility of the water and are, therefore, consequently conveyed to the environmental surroundings of the tires 24.

Therefore, it is readily apparent that the subject device is capable of providing seismic signals in water of any depth including both shallow and deep water and on dry land and intermediate surfaces such as marsh land.

Optimum results can be obtained by operating the piston and cylinder assembly inside transducer 82 to move the clam shell member 84 outwardly and inwardly with respect to member 86 at a desired rate and frequency. Additionally, the internal pressure in the transducer can be adjusted to provide the desired zero differential pressure between the air inside the transducer and the fluid inside the tires. The clam shell members 84, 86 can be operated at a controlled frequency up to the acceleration constant of the apparatus determined by its total mass. As long as these values are not exceeded, the upper portion of the tires as well as the tank and axle remain essentially unchanged with the volume change resulting in a lift to the apparatus through an outward or inward deformation of the lower portion of the tires.

However, movement of the apparatus into deeper water results in an increased proportion of the energy being transmitted from the tires 24 directly into the water. With the apparatus suspended in deep water from a floating pontoon or other suitable support, all of the energy is transmitted through the expanding and contracting tires.

It should also be noted that the transducer member 82 is mounted in casing 22 in a manner so that the reactive forces of the transducer works in a vertical direction to reinforce the upward and downward pulses of the bottom of the tires 24 against the supporting surface when the device is supported by such a surface as in FIGS. 2 and 3.

While only two tires are shown in connection to the casing 22, it should be understood that additional tires could be employed if desired for use in larger devices.

These and other variations will occur to those skilled in the art; however, it should be understood that the invention is to be limited solely in light of the appended claims.

We claim:

1. A seismic signal apparatus capable of providing seismic exploration signals on land or in water, comprising:

a main casing, transducer means mounted in said main casing for forming a signal, means attached to said casing for supporting said main casing during movement, means for providing fluid communication between said main casing and said means for supporting, and a fluid filling said main casing and further filling said means for supporting whereby actuation of said transducer means provides a signal conveyed by said fluid to said means for supporting for emission of the signal.

2. The invention of claim 1 wherein:

said means for supporting comprises tire members mounted on opposite sides of said main casing.

3. The invention of claim 2 further including:

sealed means connecting said tire members to said main casing for permitting rotation of said tire members with respect to said casing so that said device can be moved across a supporting surface.

4. The invention of claim 3 wherein:

said casing comprises:

a. a main cylindrical portion;

b. first and second laterally extending hollow tubular support arms; and c. said sealed means being mounted on the ends of said tubular support arms.

5. The invention of claim 4 further including:

a steering frame extending from said casing; and steerable wheel means mounted on said steering frame for enabling directional control of said device when said device is being towed.

6. The invention of claim 5 wherein said transducer means is fluid actuated and further including:

an air-trap dome mounted on said main casing having an interior chamber connected to said main casing by tube means; said air-trap dome containing fluid received from said main casing via said tube means and having a body of air above said fluid in said dome and an air bleed means on said dome for varying the pressure in said air trap.

7. The invention of claim 1 wherein:

said transducer means comprises a first member connected to said main casing and a second member connected to said first member by flexible coupling means for relative movement with respect to said first member.

8. The invention of claim 7 wherein:

said means for supporting comprises tire members mounted on opposite sides of said main casing.

9. The invention of claim 8 further including:

sealed means connecting said tire members to said main casing for permitting rotation of said tire members with respect to said casing so that said device can be moved across a supporting surface.

10. The invention of claim 9 wherein:

said casing comprises:

a. a main cylindrical portion;

b. a first and second laterally extending hollow tubular support arms; and c. said sealed means being mounted on the ends of said tubular support arms.

11. The invention of claim 10 further including:

a steering frame extending from said casing and steerable wheel means mounted on said steering frame for enabling directional control of said device when said device is being towed.

12. The invention of claim 11 wherein said transducer means is hydraulically actuated and further including:

an air-trap dome mounted on said main casing having an interior chamber connected to said casing by tube means and said air-trap dome containing fluid received from said main casing via said tube means and having a body of air above said fluid in said dome and an air bleed means on said dome for varying the pressure in said air trap.

13. A seismic signal apparatus comprising a main frame comprising a hollow casing having an internal chamber adapted to be filled with fluid, tires supporting said main frame for rolling movement and signal providing means including a signal transducer mounted in said chamber coupled to said tires for providing a signal to said tires to provide a seismic signal radiating from said tires.

14. The invention of claim 13 wherein said tires are filled with liquid.

15. A method of providing seismic signals comprising the steps of filling a tire with fluid; forming fluid pressure pulses externally of the tire; communicating the fluid pressure pulses to the tire to cause radiation of seismic signals from the tire.

16. The method of claim 15 further including the step of moving the tire over a land surface while causing radiation of the seismic signals.

17. The method of claim 15 further including the step of: moving the tire over a submerged surface while causing radiation of the seismic signals.

18. The method of claim 15 further including the step of:

moving the tire through a body of water in which the tire is suspended while causing radiation of the seismic signals.

19. A seismic signal source for seismic geophysical exploration beneath a surface comprising:
a. transducer means for forming a seismic signal;
b. means for hydraulically coupling the acoustic signal to the surface comprising:
  1. a casing adapted to be filled with fluid for housing said transducer means;
  2. a tire adapted to be filled with fluid for supporting said fluid-filled casing on the surface; and
  3. means for providing fluid communication between said casing and said tire, wherein acoustic signals formed by said transducer means are hydraulically coupled to the surface.

20. The structure of claim 19, wherein said transducer means comprises:
a. a seismic signal transducer producing a seismic signal;
b. a first housing member mounted with said transducer;
c. a second housing member mounted with said casing; and
d. means for flexibly connecting said first housing member with said second housing member permitting relative movement therebetween wherein signals from said transducer are transmitted into the fluid in said casing.

21. The structure of claim 20, wherein:
said first housing member is mounted substantially vertically with respect to said second housing member, wherein movement therebetween reinforces the acoustic signals hydraulically coupled with the surface.

22. The structure of claim 19, wherein said means for providing fluid communication comprises:
a. an arm mounted with said casing, said arm having a fluid passage formed therein; and
b. hub means for mounting said tire with said arm.

23. The structure of claim 22, wherein:
said hub means has a plurality of apertures formed therein for fluid communication therethrough.

24. The structure of claim 22, wherein:
said arm has a plurality of apertures formed therein for fluid communication therethrough.

25. The structure of claim 22, further including:
means for permitting relative rotational movement between said arm and said hub means.

26. The structure of claim 25, further including:
means for preventing fluid escape between said arm and said hub means.

27. The structure of claim 19, further including:
means for indicating the level of fluid in said casing.

* * * * *